United States Patent
Filipczak

(12) 
(10) Patent No.: US 6,223,679 B1
(45) Date of Patent: May 1, 2001

(54) CIRCULAR HULL STRUCTURE

(76) Inventor: Andrzej Filipczak, 4150 E. Ransom St., Long Beach, CA (US) 90804-3038

( * ) Notice: Subject to any disclaimer, the term of this patent is extended or adjusted under 35 U.S.C. 154(b) by 0 days.

(21) Appl. No.: 09/360,590

(22) Filed: Jul. 26, 1999

Related U.S. Application Data

(60) Provisional application No. 60/094,498, filed on Jul. 29, 1998.

(51) Int. Cl.$^7$ .................................................. B63B 3/00

(52) U.S. Cl. ......................... 114/355; 114/56.1; 114/274

(58) Field of Search .................................. 114/355, 356, 114/357, 65 R, 140, 126, 56.1, 274

(56) References Cited

U.S. PATENT DOCUMENTS

| | | | |
|---|---|---|---|
| 518,702 | * | 4/1894 | Schermerhorn ...................... 114/140 |
| 3,054,372 | * | 9/1962 | Jone, Jr. ............................... 114/140 |
| 3,427,671 | * | 2/1969 | Livaudais ............................. 114/356 |
| 3,598,076 | * | 8/1971 | Saxton ................................. 114/274 |
| 4,509,447 | * | 4/1985 | Smith, Sr. .......................... 114/65 R |
| 4,638,753 | | 1/1987 | Marschewski ........................ 114/56 |
| 5,594,852 | * | 1/1997 | Tankelevich ........................ 395/141 |

* cited by examiner

Primary Examiner—Stephen Avila

(57) ABSTRACT

A hulls' shape of which cross-section is a section of a circle, thus retaining symmetry of its wetted surface (9) regardless of its rolling motion or heeling while under way. Shape that results in reduced weather helm effect, and more course stability on sailboats, as well as very low water resistance on vessels in general.

5 Claims, 4 Drawing Sheets

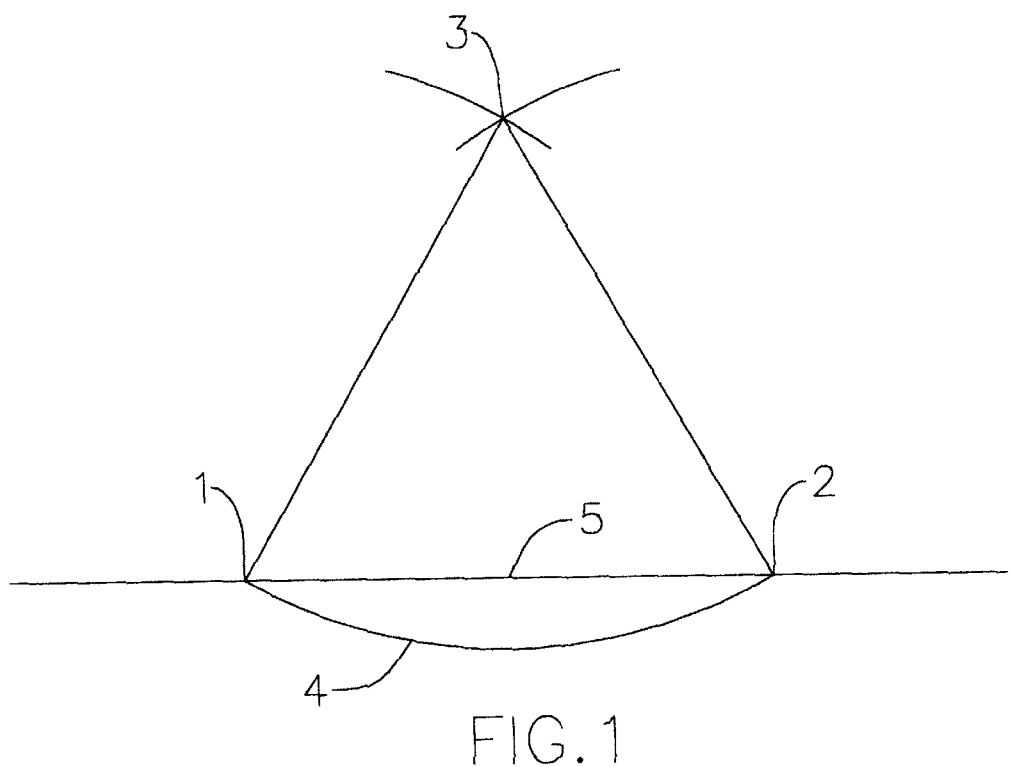
FIG. 1
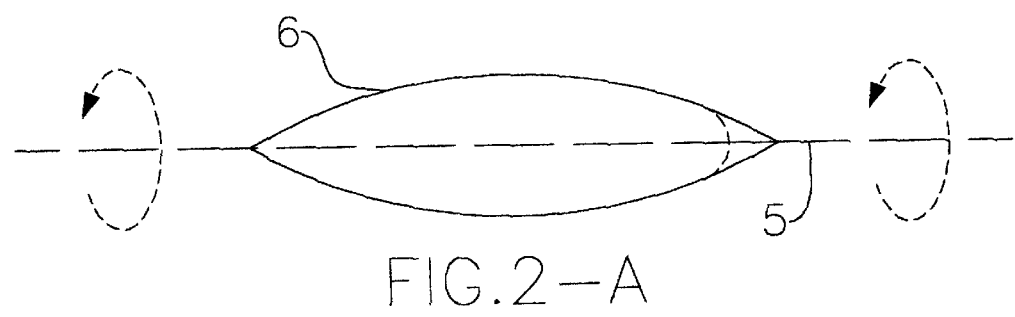
FIG. 2-A
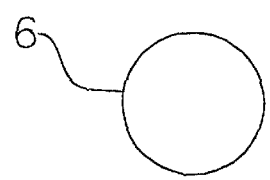
FIG. 2-B

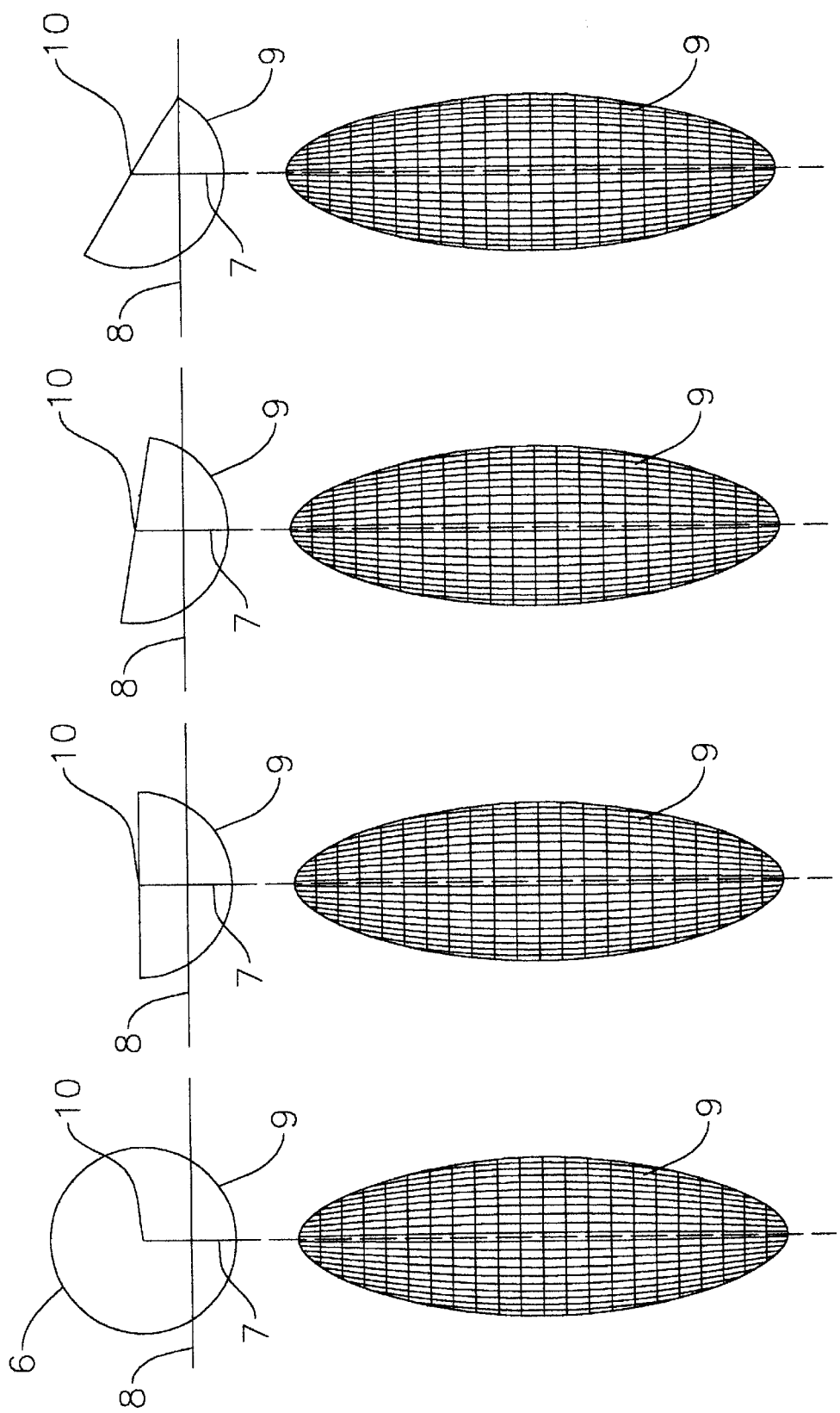

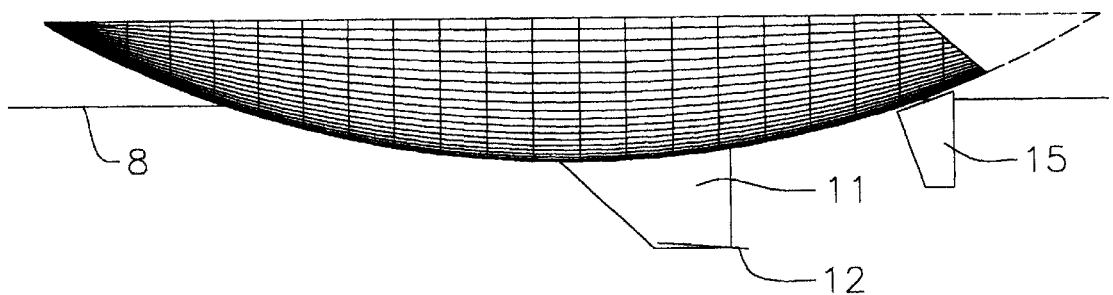
FIG. 4
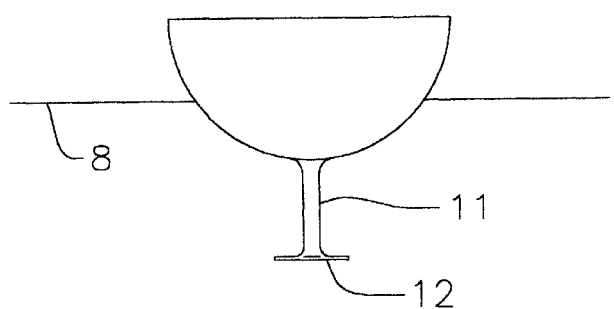
FIG. 4-A

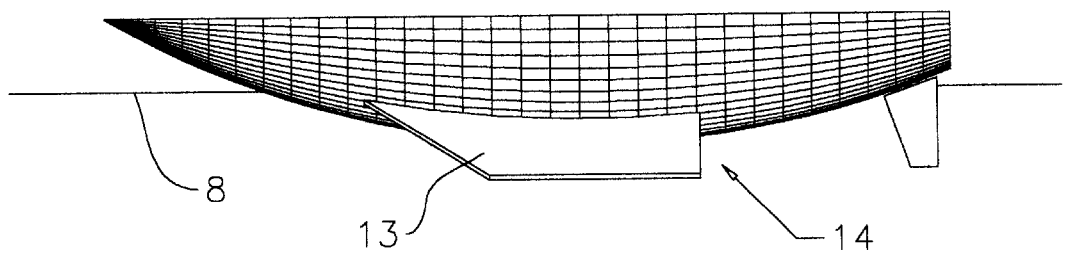
FIG.5
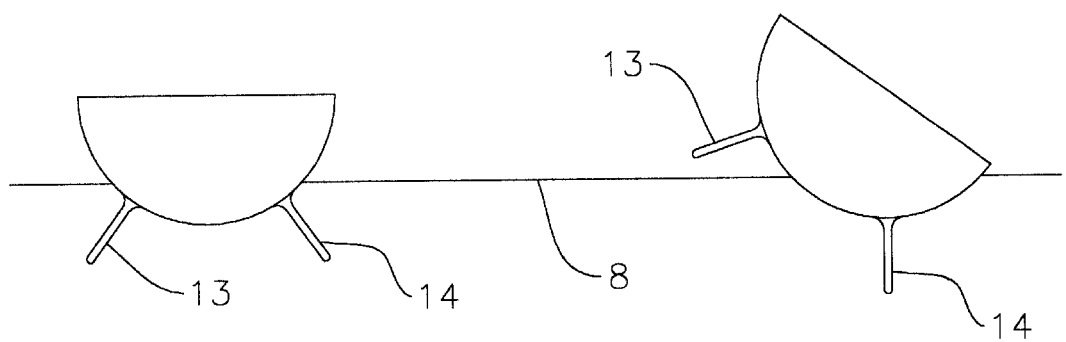
FIG.5-A

CIRCULAR HULL STRUCTURE

REFERENCE TO PRIOR PROVISIONAL APPLICATION

This application claims priority from U.S. Provisional Application No. 60/094,498 filed on Jul. 29, 1998.

BACKGROUND

1. Field of the Invention

This invention relates to vessels' hulls, especially of sailboats, namely to hulls' shapes and way of designing such hulls.

2. Background of the Invention

Sailboats heel as wind pressure increases on the sails. As a result, the wetted surfaces shape of the boat's hull changes, losing its symmetry and making the boat turn to the windward side. To compensate for this, and in order to keep the boat on a straight course the helmsman needs to turn the rudder which then, being at an angle, creates an unnecessary drag underwater, slowing the boat's speed as a result.

SUMMARY OF THE INVENTION

This invention reduces the effect of weather helm on sailboats, as well as improves vessels' behavior and steering, in rolling conditions of vessels in general (including vessels under power). Additionally, by using this invention, it is easier to achieve lower or even lowest possible water resistance for a given displacement, width and waterline length.

A hull designed according to the invention does not lose its wetted surface's symmetry when not on even keel, and the underwater resistance remains equal on both sides of its metacentric radius.

The only time when the conventional hull's wetted surface (excluding its keel) is symmetrical is when the hull is on even keel. Once the boat starts heeling, the wetted surface becomes asymmetrical. This, together with the boat's keel resistance, which moves to one side of the metacentric radius while the boat heels, makes the boat turn in one direction.

This invention will eliminate one of those two factors. The problem of asymmetry of wetted surface is solved by creating a hull structure of which the cross-section is a section of a circle. This is true because no matter which part of a circle is considered, it always has its symmetry. Thus, a hull of which the cross section is part of a circle will retain symmetry of its wetted surface, regardless of which side the wetted surface is going to move towards, as a result of rolling or heeling.

This symmetry of the wetted surface is defined by the plane on which the metacentric radius lies, and which always coincides with the direction of vertical force of buoyancy, and divides the wetted surface's cross section in half.

If a boat designed according to this invention did not have a keel, the water flow and the hull's underwater resistance would be always equal on both sides of its metacentric radius. To reduce the effect of a keel's resistance, two keels can be provided (instead of one) symmetrically spaced on both sides of the hull. At certain angles of heel, one keel would start partially coming out of the water reducing drag on the side where more drag has occurred due to both keels shifting to that side. This would start equalizing the drag on both sides of the metacentric radius at the point where it becomes significantly unequal. This embodiment of the invention is especially preferred for sailboats with shallow draft desire.

Brief Description of the Drawings

FIG. 1 Creating an arc of 180° or less as the first step in designing a hull structure.

FIG. 2a Creating a closed surface figure by turning arc 4 around axis 5 through 360°.

FIG. 2b Cross-section of surface 6.

FIG. 3a–d Shows ever-present symmetry of wetted surface 9 of the hull.

FIG. 4–4a Shows such hull with a single keel 11 provided with a hydrofoil wing 12, and rudder 15.

FIG. 5–5a Shows such hull with two keels and their distribution on the hull's surface.

Detailed Description of the Invention

FIGS. (1) and (2) show an example of creating a geometric figure of which a part is to be a hull of a vessel. In this example the figure later is cut in half along its longitudinal axis. First, an arc or any curve with a total of 180° or less of circumference is created. Point 3 is the center point of the arc 4. Distances between 1-2-3 are equal in this example but the distance 1-2 can be different than the other two. In FIG. 2a the arc has been turned 360° around its axis 5, thus creating a closed surface 6 of which a longitudinal section is shown in FIG. 2a. FIG. 2b shows the closed surface's cross section at its widest point.

In this example, the longitudinal section shown in FIG. 2a divides the closed surface into two halves and defines the upper edge of the hull(s). The cut of the mentioned closed surface can be made, so that the edge is higher in the central region of the hull to provide more freeboard for greater angles of heel. Alternatively, the cut can be made by a plane that is parallel to, but not coming through, the longitudinal axis 5. This cut would make two shells—one more closed and the other more open in shape. Both can be used as a hull structure depending on how much area of the surface would be needed for a specific vessel, which also depends on the weight and strength of the material to be used. The longitudinal cut need not be necessarily parallel to the axis 5, or be on a straight plane.

This invention allows for easy designing of variant vessels, as well as for easy and inexpensive building of such vessels.

Since the cross section (taken at any point) is a segment of a circle the wetted surface's symmetrical shape remains always the same, regardless of the vessels heeling angle, which is especially of great concern when a sailing vessel is considered.

FIG. 3 shows both cross sectional and correspondingly beneath them, underwater views of such hull at different angles on the water, and how the symmetrical shape of the wetted surface 9 remains exactly the same.

FIG. 3-a shows the cross section and wetted surface of the full surface 6 to help visualize that it can be put on the water and turned, no matter how many degrees around its axis 5, and the cross sectional shape below the waterline 8, as well as the shape of its wetted surface 9 will not change.

The metacenter 10 never changes position, and always coincides with the center point of the cross sectional circle and with the axis 5. Furthermore, all of the metacenters 10 are located on the axis 5.

The metacentric radius 7 will always lie on the plane that symmetrically divides the wetted surface in half, and is always vertical. FIG. 3-b shows such a hull sitting evenly in the water and FIG. 3-c at its heel, but in both instances the shape of the wetted surface 9 is exactly the same, and symmetrical. FIG. 3-d, shows the same hull at its maximum safe angle of heel, yet the shape of the wetted surface is still unchanged.

In FIG. 3-a, 3-b, 3-c, and 3-d, it shows clearly that the metacentric radius 7 lies on the plane that divides the wetted surface into two symmetrical halves, and is vertical, coinciding with the vertical force of buoyancy, regardless of the hull's heel angle. This allows for the wetted surface to retain equal water resistance and drag on both sides of its lowest longitudinal line at a given angle of heel.

FIG. 4. Description of keel for sailboats. A single keel 11 is situated along keel line which is the longitudinal line that divides the whole hull into two symmetrical halves and is the lowest longitudinal line when on an even keel. In this example the keel has a cutting edge with an angle of about 45°, but the keel can be of a different shape. In addition, a hydrofoil wing 12 can be provided at the keel.

FIG. 5. Description of twin keels. Two smaller keels 13 and 14 are symmetrically placed on both sides of the hull and perpendicular to the surface of the hull. They are spaced in a way so that when the boat is almost at its greatest, safe angle of heel, the windward keel 13 would be partially out of the water, while the other keel 14 would be slightly before its lowest, vertical point. When keel 14 would reach its lowest vertical point, keel 13 would be totally out of the water.

When the angle of heel becomes significantly great, one keel starts coming out of the water cutting down on underwater drag on the side on which drag has become greater due to both keels shifting towards that side. Consequently, this will cut down on the weather helm effect at its maximum.

This design is especially suitable for inland cruising boats where shallow draft is of great consideration.

Reduced weather helm effect is especially needed when a boat is being steered by an auto-pilot. Auto-pilots are unable to handle certain conditions such as sudden gusts, side rolling or sailing at great angles of heel. A boat designed according to the invention can be steered by an autopilot in a wider variety of conditions without overloading the autopilot.

I claim:

1. A vessel's hall, the hull having a shape, the hull shape at all portions conforming to a figure formed by turning an arc with a total of 180 degrees or less of circumference through 360 degrees around an axis that connects the two ends of the curved line, so that the hull retains symmetry of its wetted surface, while on the water, at any angle of heel from 0 degree angle to an angle where the wetted surface reaches the hull's upper edge for reducing deviation from the vessel's straight course at different angels of said vessel's heel.

2. A vessel's hull configuration as defined in claim 1, further including two keels spaced symmetrically on both sides of said hull.

3. A vessel's hull configuaton as defined in claim 2, wherein said keels are perpendicular to the surface of said hull.

4. A vessel's hull configuration as defined in claim 1, further including a single keel.

5. A vessel's hull configuration as defined in claim 4, further including a hydrofoil wing.

* * * * *